United States Patent [19]

Matchett

[11] Patent Number: 5,512,181
[45] Date of Patent: Apr. 30, 1996

[54] REMOVING SILICA FROM COOLING WATERS WITH COLLOIDAL ALUMINA AND DIALYSIS

[75] Inventor: Stephen A. Matchett, Grand Haven, Mich.

[73] Assignee: Nalco Chemical Company, Naperville, Ill.

[21] Appl. No.: 143,729

[22] Filed: Nov. 1, 1993

[51] Int. Cl.⁶ ................................................ B01D 11/00
[52] U.S. Cl. ........................ 210/644; 210/634; 210/649; 210/667
[58] Field of Search .................................. 210/649, 651, 210/652, 670, 673, 683, 699, 644, 667, 679, 634

[56] References Cited

U.S. PATENT DOCUMENTS

| | | | |
|---|---|---|---|
| 4,276,180 | 6/1981 | Matson | 210/683 |
| 4,332,031 | 5/1982 | Barkatt et al. | 210/670 |
| 4,670,152 | 6/1987 | Leonard | 210/651 |
| 5,073,268 | 12/1991 | Saito et al. | 210/651 |

OTHER PUBLICATIONS

Silicain Water In Relation To Cooling Tower Operation Wohlberg, C., et al. los alamos, Atomic Eng. Com. 1975 pp. 14–17.

*Primary Examiner*—Ana M. Fortuna
*Attorney, Agent, or Firm*—James J. Drake; Robert A. Miller

[57] ABSTRACT

The-silica content of cooling water blow-down waters is reduced by contacting these waters with a colloidal alumina which adsorbs a portion of the silica. The blow-down is then dialyzed to produce a permeate having a reduced silica content. In a preferred embodiment of the invention the permeate is recycled.

5 Claims, 2 Drawing Sheets

REMOVING SILICA FROM COOLING WATERS WITH COLLOIDAL ALUMINA AND DIALYSIS

BACKGROUND OF THE INVENTION

Colloidal Alumina is used to reduce the silica content of cooling water blow down.

FIELD OF THE INVENTION

INTRODUCTION

Industrial process waters particularly cooling waters which are temperature regulated by the use of cooling towers often contain dissolved silica. These waters typically contain between 40 to 60 pans per million (ppm) silica. In some areas of the Southwestern United States the concentration can range as high as 100 ppm. When these waters are concentrated into a blow down fraction, the silica content will often attain a level between 200–250 ppm. These high levels of silica in the blow down tend to produce an environmental disposal problem. Further, these high concentrations of silica in the blow down prevent the effective utilization of conventional silica removal treatments to allow recycling of the blow down waters in conjunction with known dilution recycle techniques.

Prior art methods for silica removal from cooling waters, are described in the text book title, "The Nalco Water Handbook", 2nd edition, Frank M. Kemmer, Editor, McGraw-Hill book Company, 1987. A common method of removing silica from water resides in treating the soluble silica species with metal ions, such as alumina, iron, manganese, calcium or similar ions which are capable of producing silicate precipitates. The use of aluminum compounds for silica removal is treated in depth in the literature survey entitled, "Silica in Water In Relation To Cooling Tower Operation" by Cornel Wohlberg and Jerry R. Bucholz, Los Alamos Scientific Laboratory, United States Atomic Energy Commission, 1975. The disclosure of this reference is incorporated herein. The Los Alamos article discusses silica removal with aluminum compounds using either precipitation, or coagulation techniques. Alumina compounds having ion charge capacity are also mentioned. While the methods described in the Los Alamos article have been investigated, their use has never received wide spread acceptance in the modern day treatment cooling tower blow-down waters for silica removal.

If it were possible to efficiently reduce the silica concentration of cooling tower blow-down waters, whereby these waters could be safely processed for environmental purposes, and more importantly, be recycled to provide additional makeup such would be a valuable contribution to the art.

THE INVENTION

Figure 1:
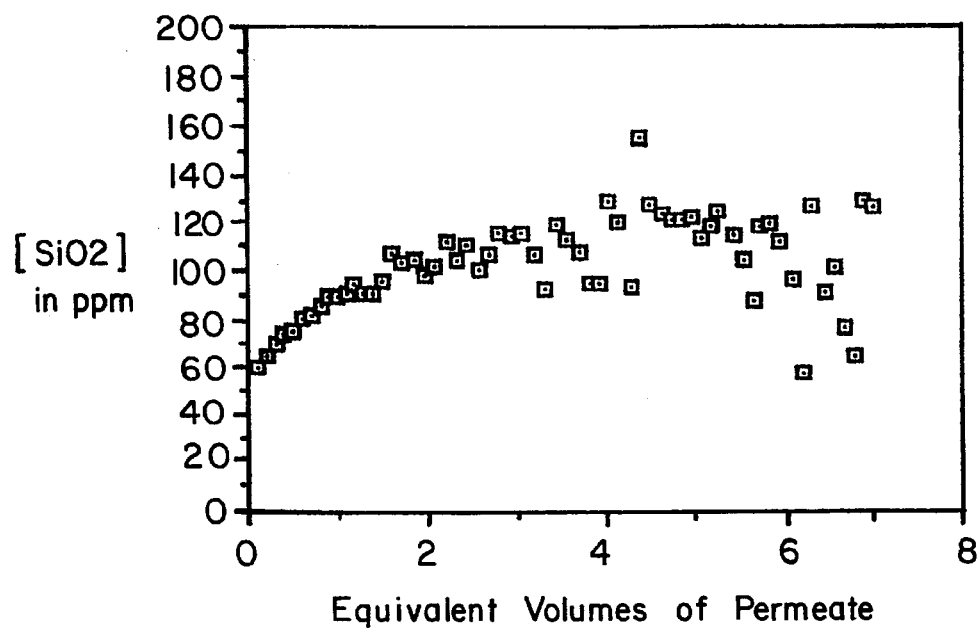
FIG. 1 shows removal efficiency of the silica sols doped with 10% by weight of alumina.

The invention relates to a method for reducing the silica content of cooling water blow-down which comprises the steps of:

a) contacting such waters with a colloidal alumina having an average surface area of at least 25 $m^2$/g for a period of time sufficient for the colloidal alumina to adsorb at least a portion of the silica.

b) dialyzing the treated blow-down to produce a permeate having a reduced silica content, and then, c) recovering the permeate.

In a preferred embodiment of the invention, the alumina is an alumina sol having a surface area of at least 100 $m^2$/g. The colloidal alumina sol may be either in the form of a pure alumina sol or a silica sol which is preferably doped with from 10 to 30% by weight of alumina, which doping process will be described more fully hereafter. In a preferred method of invention, the recovery permeate is recycled to the cooling tower make-up water, whereby it is available for use for further cooling.

THE COLLOIDAL ALUMINA

The colloidal alumina may be either in the form of a pure alumina sol or a silica sol which has been doped with alumina. Alumina sols are well known, have been available commercially and have been described in the literature. In addition to having the surface area characteristics described, it is desirable that they also have any average particle size in at least one diameter, at least five nanometers (nm). In a preferred embodiment this average particle size is between 10 and about 50 nm. The upper practical size limit for such sols with respect to stability a commercial alumina sol meeting this criteria is the alumina sol sold by Nyacol Corporation under the trademark "Nyacol Al #20®".

While alumina sols represent a preferred material for use in the practice of the invention, it is also possible to utilize so called doped silica sols. These are commercially available aqueous silica sols which have been coated with at least several molecular layers of alumina. This coating is achieved by reacting a conventional colloidal silica sol of an alkaline pH of at least about 10, with a water soluble aluminum salt, such as aluminum acetate. The aluminum salt is slowly added to the silica sol over a period of time ranging from 20 minutes to 2 hours whereby a coating is believed to occur. While the coated colloidal silica materials are discussed herein and are described as being coated, it will be understood that up to 50% of these materials may be blends of silica sols and alumina sols or various types of mixtures which may or may not be coatings per se. In any event such mixed products are considered to be included in the term "alumina coated silica sols".

The starting silica sols which may be coated in accordance with the above described procedure may be selected from a wide variety of commercially available silicas, one of which is "Nalcoag®", a trademark of Nalco Chemical Company. A listing of these sols which are available under the trademark "Nalcoag®" are set forth below in Table 1.

TABLE I

| NALCOAG | 1030 | 1034A | 1035 | 1050 | 1060 | 1130 | 1140 |
|---|---|---|---|---|---|---|---|
| Percent colloidal silica, as $SiO_2$ present. | 30 | 34 | 35 | 50 | 50 | 30 | 40 |
| pH | 10.2 | 3.1 | 8.6 | 9.0 | 8.5 | 10 | 10 |
| Average particle size, nanometers | 11–16 | 16–22 | 16–22 | 17–25 | 40–60 | 8 | 15 |
| Average surface area, $m^2$/gram | 190–270 | 135–190 | 135–190 | 120–176 | 50–75 | 375 | 200 |
| Specific gravity at 68° F. | 1.205 | 1.230 | 1.255 | 1.385 | 1.390 | 1.214 | 1.206 |
| Viscosity at 77° F. c.p.s. | ¹1 | ¹5 | 5 | ¹70 | 5–10 | 7 | 8 |
| $Na_2O$, percent | 0.40 | ¹0.01 | 0.10 | 0.30 | 0.10 | 0.65 | 0.40 |

¹Less than.

As in the case of the alumina sols per se, the alumina doped colloidal silica sols should also have the same surface area characteristics as well as the same average particle size designations described with respect to such alumina sols. The amount of alumina coated on the colloidal silica sols is usually from a commercially practical standpoint about 5% with a preferred range being 10 to 30% by weight of alumina based on the silica sol upon which it is coated.

THE DIALYSIS MEMBRANE

Dialysis membranes are available commercially from a variety of suppliers. The main criteria for selecting a dialysis membrane is that the membrane contain average size pores that allow the dissolved solids coexisting with the alumina colloid which has adsorbed the silica to pass through to form a permeate. At the same time the membrane should not allow the colloidal alumina or alumina doped silica sol containing adsorbed silica to pass through the membrane. Amicon XM300®, acrylic copolymer average pore size 300,000 grams per mole.

OPERATION OF THE PROCESS

The process operates in a preferred embodiment of the invention in the following manner. The cooling tower blow-down should be so manipulated whereby good mixing with the colloidal alumina and the cooling tower blow-down containing the high concentrations of silica be achieved. This can be effected by utilizing mixing devices to assure that good contact between the colloidal alumina and the blow-down containing the silica is achieved. After good mixing is achieved the blow-down water containing the colloidal alumina is placed in a diafiltration cell, where the soluble components of the blow-down pass through the membrane of the cell and provide a permeate. Remaining within the cell is the colloidal alumina which has the ability to adsorb a large portion of the silica contained in the cooling tower of the blow-down water. The soluble silica not retained or captured by the colloidal alumina passes through with the dissolved solids. The permeate which contains dissolved silica at a much lower level than that originally contained in the blow-down, along with other dissolved solids are then returned directly or diluted with additional makeup water to the cooling tower where it is utilized for additional cooling.

The amount of silica capable of being removed by the alumina colloid depends upon a number of factors: retention time, the temperature of the system, the pH, which in a preferred embodiment should be greater than 7 and preferably 10 and the concentration of the colloidal alumina. The colloidal alumina is utilized at a dosage of between about 10 to 30% by weight, although greater or lesser amounts maybe used. The, silica content of conventional blow-don are readily reduced nearly in hall In using a diafiltration cell as described, it is possible that 8 equivalent volumes of blow-down may be passed through the cell with good silica reduction being obtained. "Equivalent volume" means the volume of the cell used to hold the alumina colloid. Thus if a 60 millimeter cell is used, one equivalent volume of permeate means that 60 milliliters of permeate has passed from the cell.

Diafiltration Cell

A 60 ml cell which can be stirred with a magnetic stirrer. Feed inlet is at the cell top, outlet is through the dialysis membrane at the bottom of the cell.

To illustrate the advantages of the invention, reference may be had to FIGS. 1, 2, 3, and 4.

FIG. 1 illustrates that a silica colloid doped with a 10 weight % of alumina ion is capable of reducing a soluble silica in a 211 ppm silica feed stream to about 120 ppm and holding it there.

Figure 2:
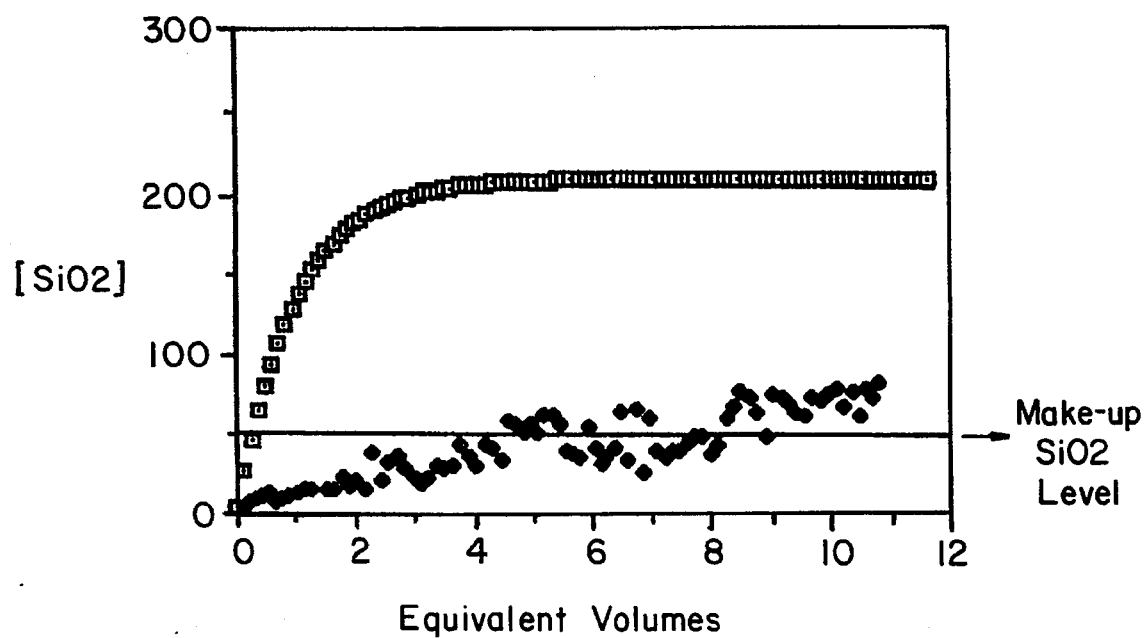
FIG. 2 shows the use of an alumina sol for effectively removing silica.

FIG. 2 shows the use of a pure alumina colloid as doing a superior job in reducing the content of water feed to the diafiltration cell.

Figure 3:
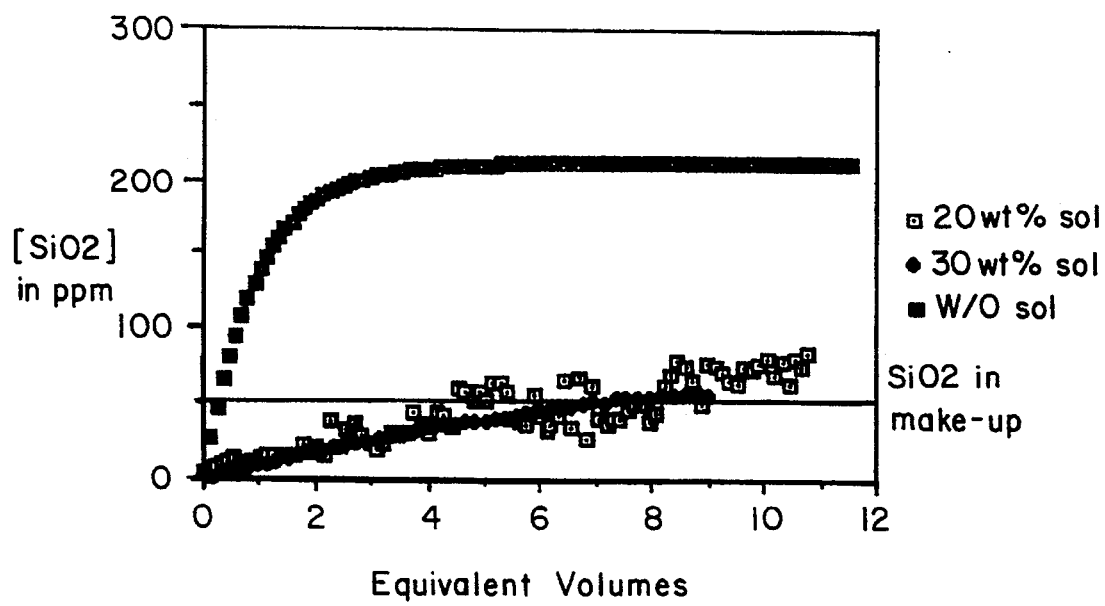
FIG. 3 shows that by increasing the concentration of the alumina sol it slightly improves the performance with respect to silica removal.

FIG. 3 shows the effect achieved when the concentration of the alumina sol, is increased from 20 to 30% by weight.

Figure 4:
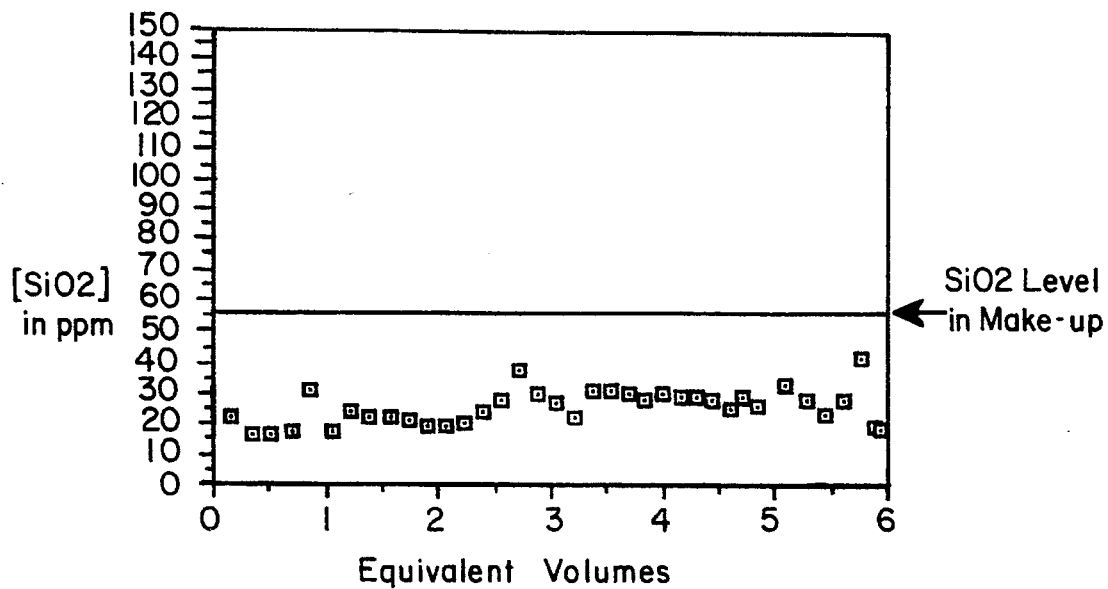
FIG. 4 shows the ability of a 20% alumina sol for removing soluble silica from a synthetic cooling tower blow-down.

FIG. 4 shows the ability of a 20 weight % alumina sol to reduce the silica content of a synthetic cooling tower blow-down formulation.

The doped silica sol used to furnish the results shown in FIG. 1 is prepared by treating Nalcoag 1030 which is described in Table 1 with 20% by weight of aluminum ion in the form of aluminum acetate. The addition was made at a temperature of 95°. It was added slowly over a period of about ½ hour to prevent rapid self condensation of the aluminum salt at the elevated pH of the system which was 10.2 pH of the N030 sol.

ADVANTAGES OF THE INVENTION

The invention has the following advantages:

1. The silica levels and cooling tower blow-down waters may be substantially reduced thereby allowing its recycle and reuse for cooling purposes.
2. The ability to recycle the portion of the treated water makes it easier to meet environmental discharge requirements. The colloidal surfaces of the colloidal alumina provide a high capacity at a low cost, thereby allowing an inexpensive process to be utilized in removal of a soluble silica from cooling tower blow-downs.

It will be understood that while the invention has been described with respect to the colloidal alumina as adsorbing the silica from the cooling tower water blow-down, it should be understood that the exact mechanism whereby the colloidal alumina operates to remove silica is not completely understood. It is believed, however, that the mechanism is not an ion exchange but adsorption or a related phenomena.

Having thus described my invention it is claimed as follows:

1. A method for reducing the silica content of cooling water blow-down which comprises the steps of:
   a) adding an effective silica absorbing amount of a colloidal alumina having an average surface area of at least $25m^2/g$ to a cooling water blow-down containing silica;
   b) mixing the cooling water blow-down with the colloidal alumina for a period of time sufficient for the colloidal alumina to adsorb at least a portion of the silica;.
   c) dialyzing the cooling water blow-down in a diafiltration cell containing a membrane whereby said cooling water blow-down permeates through the membrane; and then,
   d) recovering as the permeate a cooling water blow-down having a reduced silica content.

2. The method of claim 1 where the colloidal alumina is an alumina sol having a surface are of at least $100m^2/g$.

3. The method of claim 1 where the colloidal alumina is a silica sol doped with 10 to 30% by weight of alumina.

4. The method of claim 3 where the alumina doped silica sol has a surface area of at least $100 \ m^2/g$.

5. The method of claim 1 where the recovered cooling water blow-down is recycled by returning to the cooling tower as make-up water.

* * * * *

UNITED STATES PATENT AND TRADEMARK OFFICE
CERTIFICATE OF CORRECTION

PATENT NO. : 5,512,181

DATED : APRIL 30, 1996

INVENTOR(S) : STEPHEN A. MATCHETT

Page 1 of 4

It is certified that error appears in the above-indentified patent and that said Letters Patent is hereby corrected as shown below:

On the title page: Item [56]

OTHER PUBLICATIONS

Silicain Water In Relation To Cooling Tower Operation
Wohlberg, C., et al, los alamos, Atomic Eng. Com. 1975 pp,

LETTERS PATENT SHOULD READ AS:

Silica In Water In Relation To Cooling Tower Operation

Wohlberg, C., et al, Los Alamos, Atomic Eng. Com. 1975 pp.

ABSTRACT

The-silica content of cooling water blow-down waters is

LETTERS PATENT SHOULD READ AS:

The silica content of cooling water blow-down waters is

UNITED STATES PATENT AND TRADEMARK OFFICE
CERTIFICATE OF CORRECTION

PATENT NO. : 5,512,181
DATED : APRIL 30, 1996
INVENTOR(S) : STEPHEN A. MATCHETT

It is certified that error appears in the above-indentified patent and that said Letters Patent is hereby corrected as shown below:

Column 1, Line 17 contain between 40 to 60 pans per million (ppm) silica.

LETTERS PATENT SHOULD READ AS:

contain between 40 to 60 <u>parts</u> per million (ppm) silica.

Column 3, Line 66 & 67 to 30% by weight, although greater or lesser amounts maybe used. The, silica content of conventional blow-don are

LETTERS PATENT SHOULD READ AS:

to 30% by weight, although greater or lesser amounts <u>may be</u> used. Th<u>e</u> silica content of conventional <u>blow-downs</u> are

UNITED STATES PATENT AND TRADEMARK OFFICE
CERTIFICATE OF CORRECTION

PATENT NO. : 5,512,181
DATED : APRIL 30, 1996
INVENTOR(S) : STEPHEN A. MATCHETT

It is certified that error appears in the above-indentified patent and that said Letters Patent is hereby corrected as shown below:

Column 4, Line 1 readily reduced nearly in hallIn using a diafiltration cell as

LETTERS PATENT SHOULD READ AS:

readily reduced nearly in half. In using a diafiltration cell as

UNITED STATES PATENT AND TRADEMARK OFFICE
CERTIFICATE OF CORRECTION

PATENT NO. : 5,512,181
DATED : APRIL 30, 1996
INVENTOR(S) : STEPHEN A. MATCHETT

It is certified that error appears in the above-indentified patent and that said Letters Patent is hereby corrected as shown below:

Column 5, Claim 1, Line 9 a) adding an effective silica absorbing amount of a col-

Please remove: effective silica absorbing

Column 5, Claim 1, Line 12 silica;

LETTERS PATENT SHOULD READ AS:

silica effective to absorb silica;

Signed and Sealed this

Fifteenth Day of October, 1996

Attest:

BRUCE LEHMAN

*Attesting Officer*     *Commissioner of Patents and Trademarks*